(12) United States Patent
Cornelissen

(10) Patent No.: US 10,330,346 B2
(45) Date of Patent: Jun. 25, 2019

(54) METHOD FOR MANUFACTURING A CERAMIC ROOF TILE, AS WELL AS ROOF TILE PROVIDED WITH A SOLAR HEAT RECEIVING PANEL AND HOT WATER SYSTEM PROVIDED WITH SUCH ROOF TILES

(71) Applicant: Johan Cornelissen, Meppel (NL)

(72) Inventor: Johan Cornelissen, Meppel (NL)

(73) Assignee: ZEP B.V., Urk (NL)

( * ) Notice: Subject to any disclaimer, the term of this patent is extended or adjusted under 35 U.S.C. 154(b) by 426 days.

(21) Appl. No.: 14/916,972

(22) PCT Filed: Sep. 8, 2014

(86) PCT No.: PCT/NL2014/050615
§ 371 (c)(1),
(2) Date: Mar. 4, 2016

(87) PCT Pub. No.: WO2015/034366
PCT Pub. Date: Mar. 12, 2015

(65) Prior Publication Data
US 2016/0231024 A1    Aug. 11, 2016

(30) Foreign Application Priority Data

Sep. 6, 2013 (NL) ..................................... 2011398
Sep. 6, 2013 (NL) ..................................... 2011399

(51) Int. Cl.
*F24S 20/69* (2018.01)
*F24S 70/25* (2018.01)
(Continued)

(52) U.S. Cl.
CPC ............ *F24S 20/69* (2018.05); *B28B 7/0097* (2013.01); *B28B 7/164* (2013.01); *B28B 7/18* (2013.01);
(Continued)

(58) Field of Classification Search
CPC ........... F24S 20/69; Y02B 10/20; Y02B 10/12
See application file for complete search history.

(56) References Cited

FOREIGN PATENT DOCUMENTS

DE            3026217 A1 *  2/1982  ............. F24S 20/66
DE    20 2010 005 806 U1    9/2010
(Continued)

OTHER PUBLICATIONS

DE 3026217 A1—English machine translation.*
(Continued)

*Primary Examiner* — Jorge A Pereiro
(74) *Attorney, Agent, or Firm* — Shewchuk IP Services, LLC; Jeffrey D. Shewchuk

(57) ABSTRACT

When a roof tile provided with a hole is manufactured, first a non-cured composition 11 is fed between two facing mold surfaces 13b and 15b of two mold halves 13 and 15 after which the two mold halves are brought together.

The mold surface 13b of one of the two mold halves 13 is provided with a bulge 17 which has a thickness 19 that is smaller than the distance 21 between the two mold surfaces 13b and 15b at the location of this bulge in the state of the mold halves brought together. As a result, the roof tile obtains a thin part 23 at the location of this bulge 17.

After the pressing operation the two mold halves 13 and 15 are taken apart and the composition 11 is cured. Once the roof tile 1 has cured, the thin part 23 is broken away from the roof tile and in this manner the hole 5 in the roof tile is formed.

11 Claims, 5 Drawing Sheets

(51) Int. Cl.
*B28B 7/16* (2006.01)
*B28B 7/18* (2006.01)
*B28B 7/00* (2006.01)
*F24D 17/00* (2006.01)

(52) U.S. Cl.
CPC .......... *B28B 7/186* (2013.01); *F24D 17/0015* (2013.01); *F24S 70/25* (2018.05); *Y02B 10/20* (2013.01); *Y02E 10/44* (2013.01)

(56) References Cited

FOREIGN PATENT DOCUMENTS

| EP | 0 547 285 A1 | | 6/1993 | |
|---|---|---|---|---|
| JP | 08259306 A | * | 10/1996 | |
| JP | 2001349006 A | * | 12/2001 | ........... C04B 41/009 |
| JP | 2007016425 A | * | 1/2007 | |
| JP | 2013 007174 A | | 1/2013 | |

OTHER PUBLICATIONS

JP 08259306 A—English machine translation.*
JP 2007016425 A—English machine translation.*
JP 2001349006 A—English machine translation.*

* cited by examiner

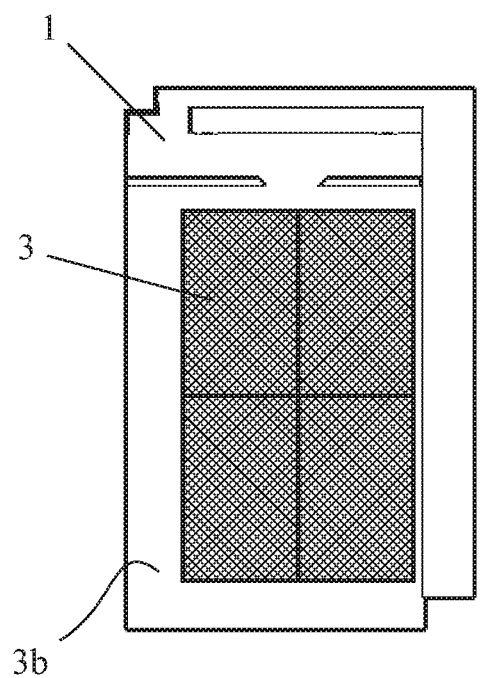
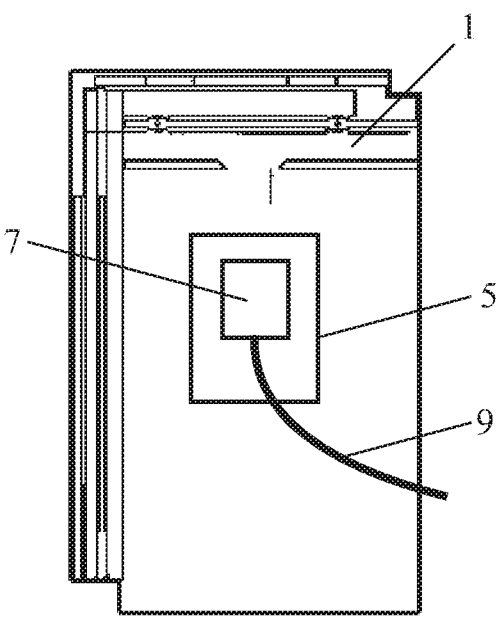
FIG. 1  FIG. 2
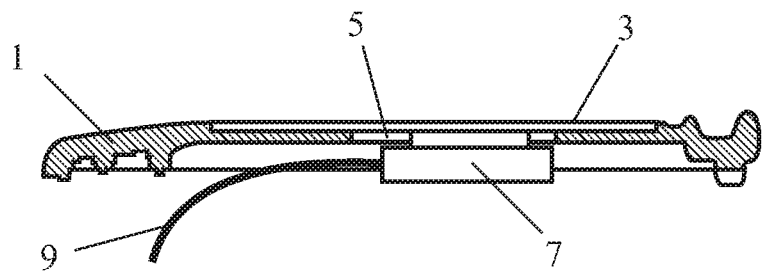
FIG. 3
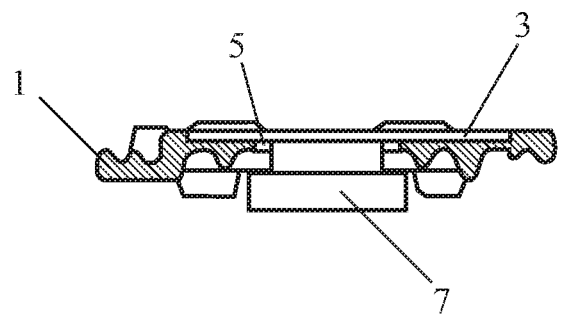
FIG. 4

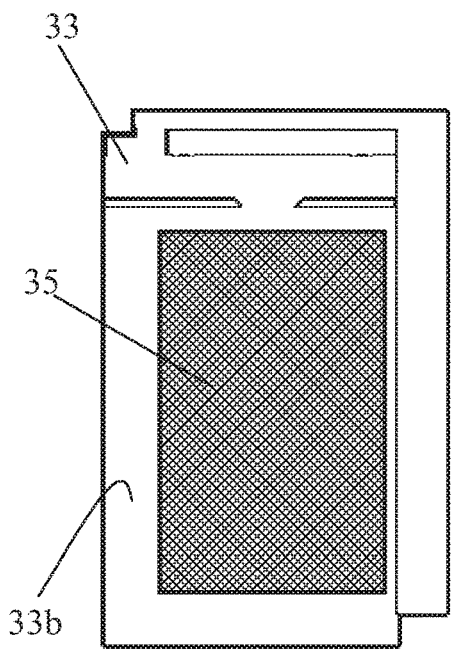
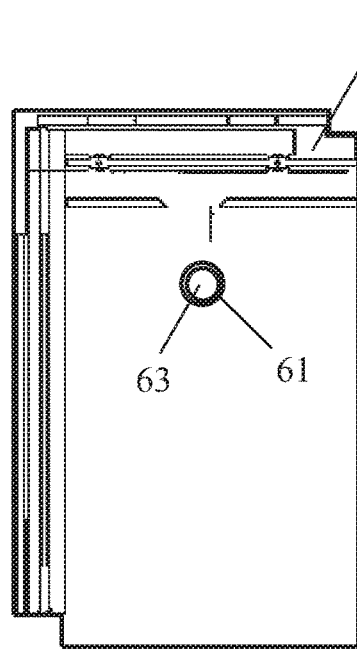
FIG. 14  FIG. 15
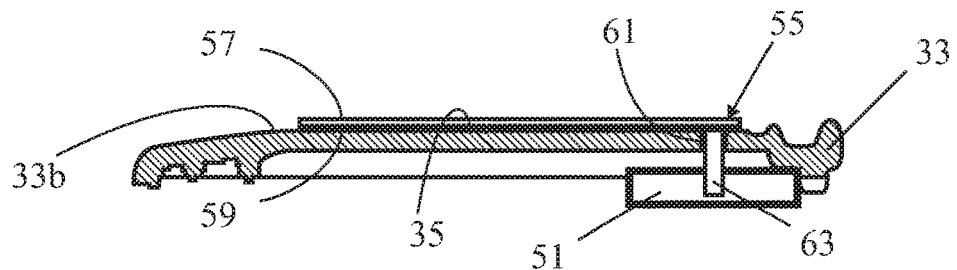
FIG. 16
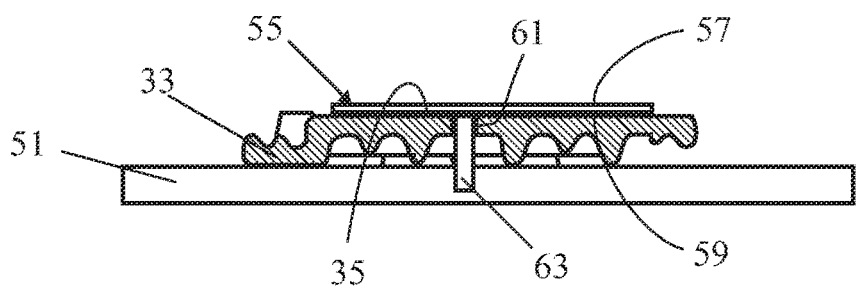
FIG. 17

METHOD FOR MANUFACTURING A CERAMIC ROOF TILE, AS WELL AS ROOF TILE PROVIDED WITH A SOLAR HEAT RECEIVING PANEL AND HOT WATER SYSTEM PROVIDED WITH SUCH ROOF TILES

FIELD OF THE INVENTION

The invention relates to a method of manufacturing a ceramic roof tile provided with a hole, comprising:
applying a non-cured composition between two facing mold surfaces of two mold halves;
pressing the two mold halves together during which operation the composition is pressed into the desired shape in the mold space between the two mold surfaces; and
subsequently curing the composition pressed into the desired shape,
The invention likewise relates to a method of manufacturing a ceramic roof tile provided with a solar panel.

STATE OF THE ART

A roof tile and a solar-cell-clad roof tile are known from FR-A-2 957 100. This known roof tile comprises a solar panel on the upper side and electrical conductors connected to it running over the upper side of the roof tile towards the side. During use on a roof these conductors are located underneath a part of an adjacent roof tile and connected underneath the roof tiles to a conductor that leads to a converter.

In this manner there is no need to introduce a hole in the roof tile for leading away the electrical conductors. Introducing a hole in a roof tile is a cumbersome operation and may lead to the roof tile being damaged.

A disadvantage of this known solar-panel-clad roof tile is that the required electronics are to be positioned beside the solar panel too, whereas with the current solar panels the electronic unit is located underneath the solar panels. As a result, no current solar panels can be utilized, but specially manufactured solar panels are required, which are mostly more expensive than the current solar panels.

SUMMARY OF THE INVENTION

It is an object of the invention to provide a roof tile of the type defined in the opening paragraph which is provided with a hole where there is a minor chance of the roof tile being damaged. For this purpose the method according to the invention is characterized in that one of the two mold halves is provided on the mold surface with a bulge that has a thickness that is smaller than the distance between the two mold surfaces in a position of the two mold halves brought together, so that a roof tile having a thinned part in it is manufactured and, after curing of the roof tile, breaking of the thinned part of the roof tile. By first manufacturing a roof tile that has a thinned part and subsequently breaking away this thinned part, it is avoided that the roof tile would be distorted (warp) as a result of internal strains which occur if already before the curing process a hole would be present in the roof tile.

This hole-containing roof tile is pre-eminently suitable for producing a ceramic roof tile provided with a solar panel, because when this roof tile is used current solar panels having the electronic unit on the under side of the solar panel can be used. After the solar panel has been applied to the upper side of the roof tile, the electronic unit located on the under side of the roof tile projects through the hole provided in the roof tile and electrical conductors can be connected to the electronic unit in a simple manner.

The invention further relates to a roof tile provided with a solar heat absorbing panel.

A roof tile of this type is generally known in the form of a solar-panel-clad roof tile. A disadvantage of these known roof tiles is that energy is generated which, if one wishes to use this energy for heating purposes, is to be converted again into heat leading to considerable loss of efficiency.

It is a further object of the invention to provide a roof tile comprising a solar heat absorbing panel by which heat is directly generated. For this purpose, the roof tile according to the invention is characterized in that a metal coating is present on at least part of the upper side of the roof tile, which metal coating can be connected to a heat conductor via a conducting element. The sun light then directly heats up the metal coating which transfers its heat via the conducting element and the heat conductor directly to the medium to be heated. This causes less loss of efficiency to occur than when heating is provided by means of the known solar-panel-clad roof tiles.

A preferred embodiment of the roof tile according to the invention is characterized in that the conducting element comprises a pin of which an end is mounted to the under side of the metal coating and a hole through which the pin is projected is present in the roof tile. The heat can be transferred in the shortest way possible to the heat conductor through a hole in the roof tile, which leads to the least possible loss of heat. At the same time the construction can thus be executed in a simple and robust manner.

A further advantageous embodiment of the roof tile according to the invention is characterized in that it comprises a double-walled plate which is mounted to the upper side of the roof tile and whose upper wall is transparent while the metal coating is applied to the inside of the lower wall, where the space between the walls is shut off from the environment in an airtight manner and a reduced pressure relative to the environment is found in this space, preferably vacuum. In this manner even more heat can be received from the sunlight incident on the roof tile.

The invention also relates to a hot water system comprising roof tiles provided with solar heat absorbing panels, as well as roof battens on which the roof tiles can be hooked. With respect to the hot water system the invention is characterized in that a metal coating is present on at least part of the upper side of the roof tile, which metal coating can be connected via a conducting element to a heat conductor. The roof battens then preferably form the heat conductors.

An advantageous embodiment of the hot water system according to the invention is characterized in that the heat conductors are formed by box profiles and are connected to a liquid circulation system which causes liquid to flow through the box profiles. The hot water system preferably also includes a liquid buffer vessel to which the pipes are connected coming from and leading to the profiles.

BRIEF DESCRIPTION OF THE DRAWINGS

The invention will be further elucidated below with reference to examples of embodiment represented in the drawings of the roof tile provided with a solar panel and method of manufacturing this roof tile, as well as the hot water system and the roof tile according to the invention used in this system, in which:

FIG. 1 shows a bottom view of a roof tile provided with a solar panel;

FIG. 2 shows a plan view of the roof tile shown in FIG. 1;

FIG. 3 shows a longitudinal view of the roof tile shown in FIG. 1;

FIG. 4 shows a cross-sectional view of the roof tile shown in FIG. 1;

FIG. 14 shows a bottom view of a metal-coating-clad roof tile;

FIG. 15 shows a plan view of the roof tile shown in FIG. 14;

FIG. 16 shows a longitudinal view of the roof tile shown in FIG. 14; and

FIG. 17 shows a cross-sectional view of the roof tile shown in FIG. 14.

DETAILED DESCRIPTION OF THE DRAWINGS

Figure 5:
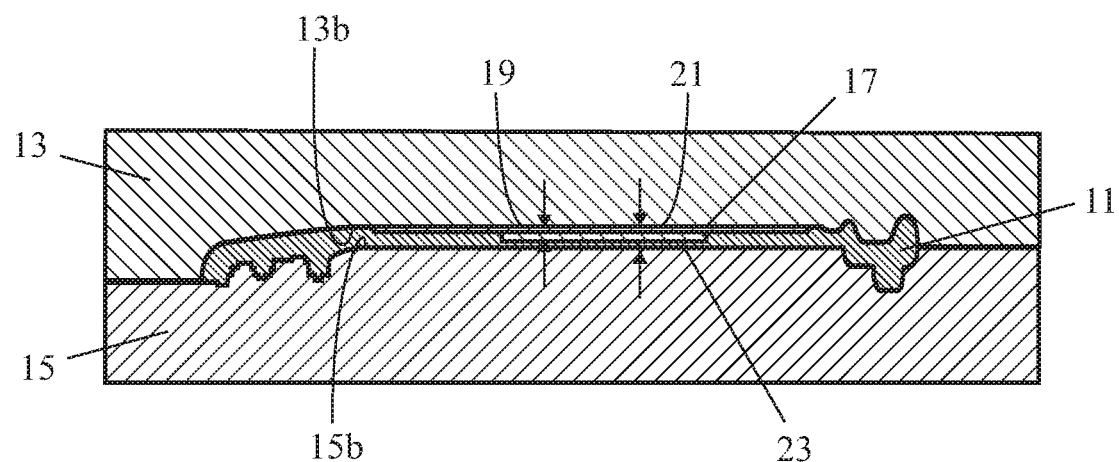
FIG. 5 shows a sectional view of a first embodiment of a mold in closed state during the manufacturing process of the roof tile.

FIGS. 1 to 4 show an embodiment of the solar-panel-clad roof tile according to the invention in bottom view, plan view, longitudinal view and cross-sectional view, respectively. The roof tile 1 has an upper side 3b to which a solar panel 3 is attached, (see FIG. 1). A rectangular hole 5 is provided near the middle of the roof tile (see FIG. 2), which hole is bounded all around by parts of the roof tile. An electronic unit 7 mounted to the under side of the solar panel projects through this hole (see FIGS. 3 and 4). The electrical conductors 9 attached to the electronic unit are located underneath the roof tile during operation and, in consequence, invisible.

Figure 6:
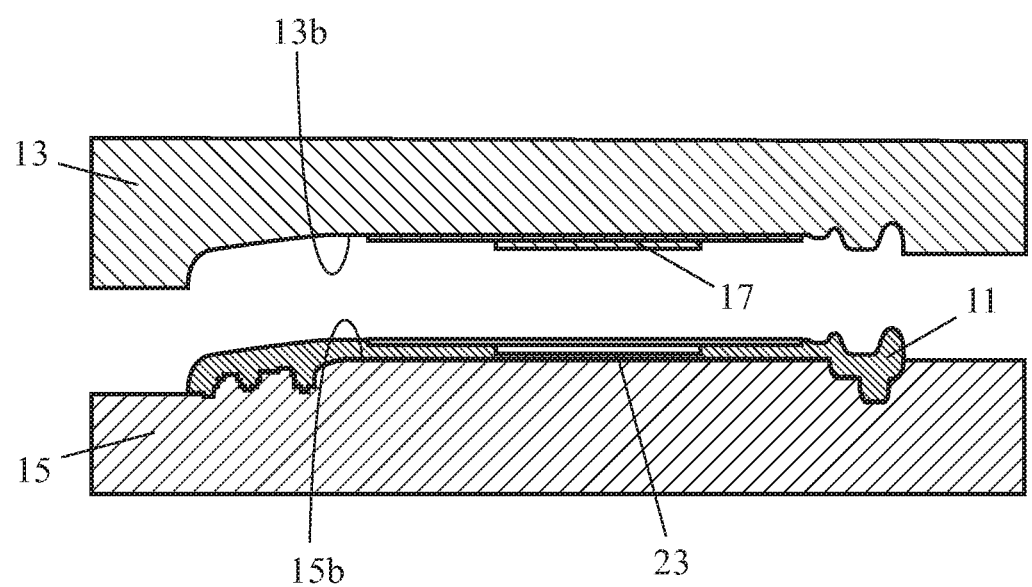
FIG. 6 shows the mold shown in FIG. 5 in open state after the formation of the roof tile.
Figure 7:
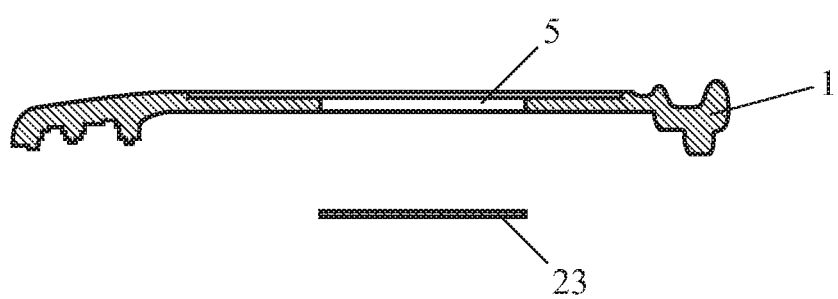
FIG. 7 shows the breaking away of the thin part from the cured roof tile.

FIGS. 5 to 7 show various steps during a first embodiment of the method of manufacturing a ceramic roof tile provided with a hole. When manufacturing a roof tile of this type, first a non-cured composition 11 is fed between two facing mold surfaces 13b and 15b of two mold halves 13 and 15, after which the two mold halves are moved towards each other, where the composition is pressed into the desired shape in the molding space between the two mold surfaces (see FIG. 5). The composition 11 mainly comprises clay plus several additives added to the composition.

One of the two mold halves 13 has a mold surface 13b with a bulge 17 which has a thickness 19 that is smaller than the distance 21 between the two mold surfaces 13b and 15b at the location of this bulge in a state of the two mold halves showing minimum distance to each other. In consequence, the roof tile obtains a thin part 23 at the location of this bulge 17.

Subsequent to the pressing operation, the two mold halves 13 and 15 are taken apart (see FIG. 6) and the composition 11 thus formed is cured. This is preferably effected in an oven.

Once the roof tile 1 has cured or at least nearly cured, the thin part 23 is broken away from the roof tile (see FIG. 7) and thus the hole 5 in the roof tile is realized.

Figure 8:
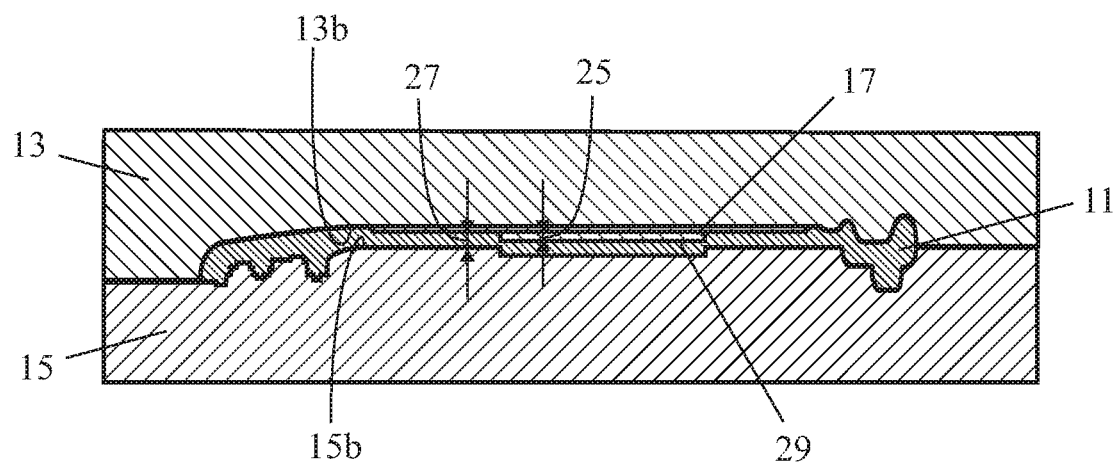
FIG. 8 shows a sectional view of a second embodiment of a mold in closed state during the manufacturing process of the roof tile.
Figure 9:
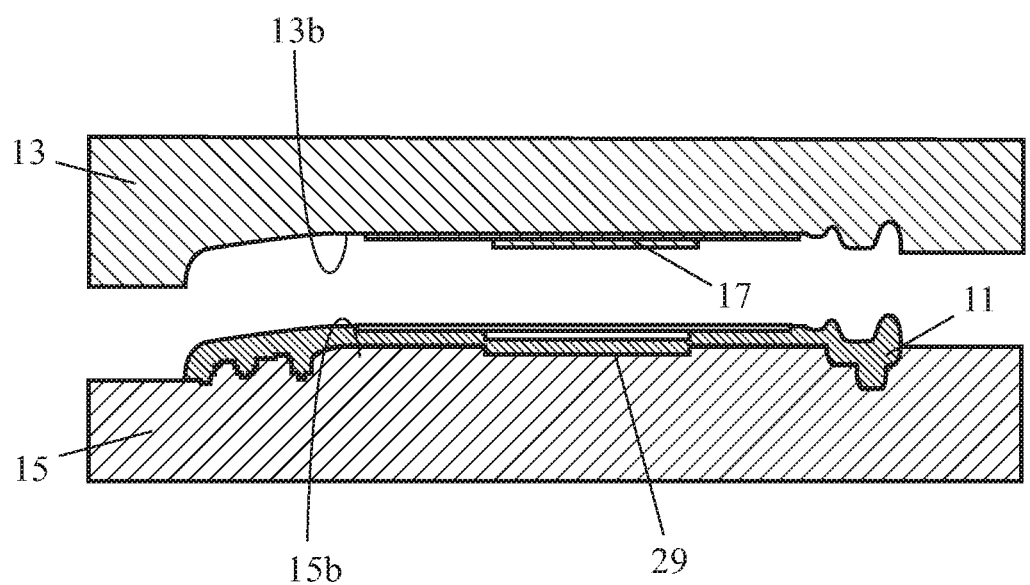
FIG. 9 shows the mold shown in FIG. 8 in open state after the formation of the roof tile.
Figure 10:
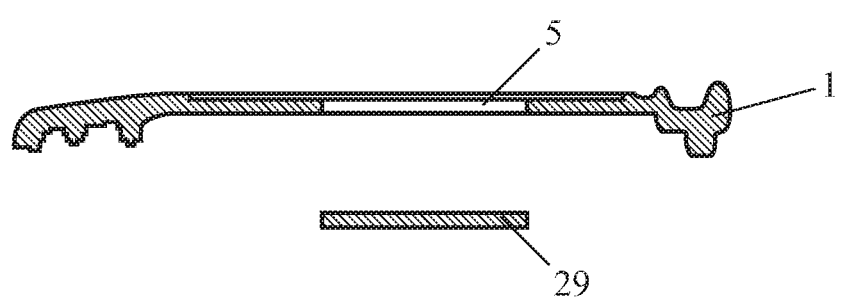
FIG. 10 shows the breaking away of a middle portion from the cured roof tile.

FIGS. 8 to 10 show various steps during a second embodiment of the method of manufacturing a ceramic roof tile provided with a hole. When a similar roof tile is manufactured, again first a non-cured composition 11 is fed between two facing mold surfaces 13b and 15b of two mold halves 13 and 15, after which the two mold halves are moved towards each other, where the composition is pressed into the desired shape in the molding space between the two mold surfaces (see FIG. 8). This composition 11 too mainly comprises clay plus several additives added to the composition.

The surface 13b of one of the mold halves 13 is provided with a bulge 17 which has a thickness 25 that is smaller than the distance 27 between the two mold surfaces 13b and 15b directly beside this bulge in a state of the two mold halves showing minimum distance to each other. The other mold half 15 shows a hole located opposite to the bulge, which hole has a depth that is equal to the thickness of the bulge. In consequence, the roof tile obtains a middle portion 29 at the location of this bulge 17, which middle portion is connected along its periphery to the rest of the roof tile through a thinned part.

After the pressing operation, the two mold halves 13 and 15 are taken apart (see FIG. 9) and the thus formed composition 11 is cured. This is preferably effected in an oven.

Once the roof tile 1 has cured or at least nearly cured, the middle portion 29 is broken away from the roof tile (see FIG. 10) and thus the hole in the roof tile 5 is formed.

Figure 11:
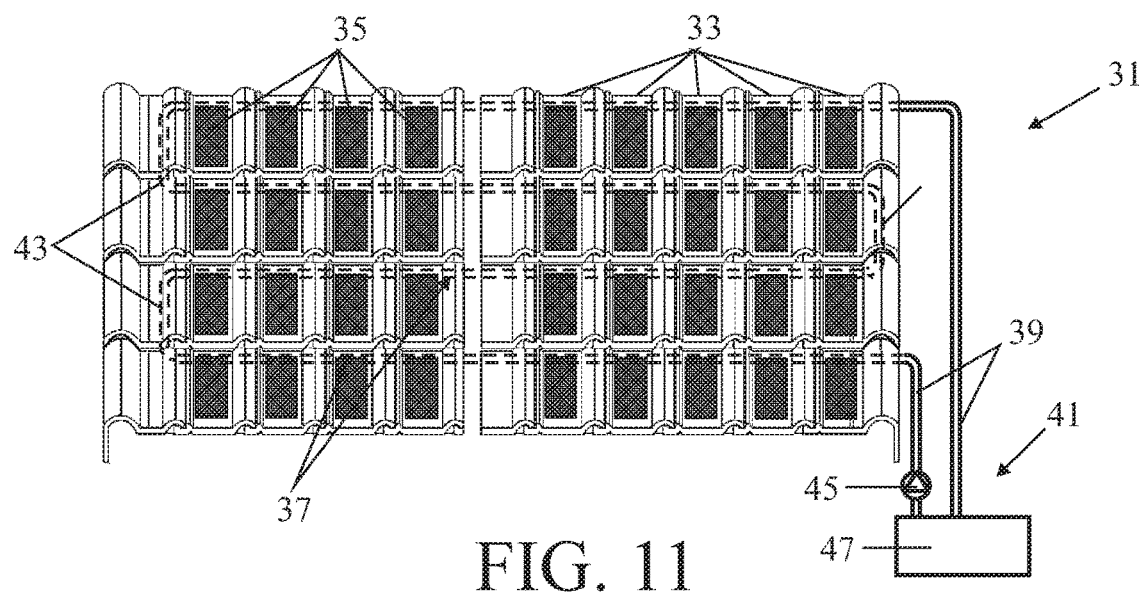
FIG. 11 shows an embodiment of the hot water system according to the invention.
Figure 12:
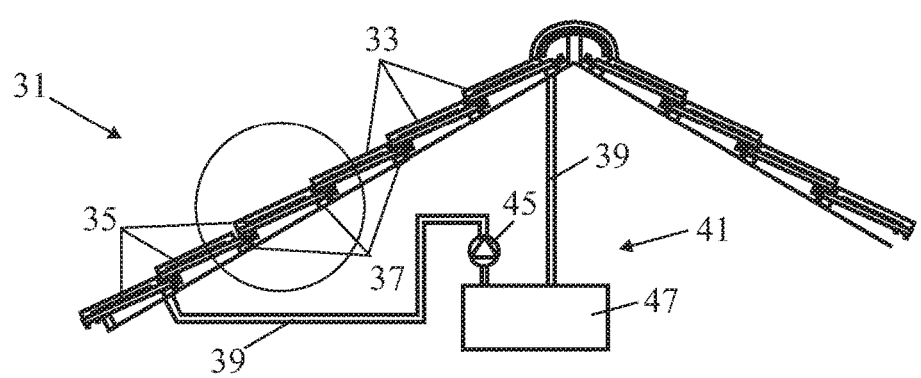
FIG. 12 shows a sectional view of the hot water system present on a roof.

FIGS. 11 and 12 show an embodiment of the hot water system according to the invention. The hot water system 31 comprises a plurality of roof tiles 33 provided with a metal coating 35, as well as roof battens 37 on which the roof tiles are hooked. The roof battens function as heat conductors and have a box-shaped profile that forms a channel for a liquid that transports the heat absorbed by the metal coating to a heating system. An end of the bottom profile and an end of the top profile are connected by means of pipes 39 to a liquid circulation system 41 which causes liquid to flow through the profiles. The other ends of the profiles are connected to each other by means of connecting pipes 43. The liquid circulation system 41 further includes a circulation pump 45 and a buffer vessel 47.

This hot water system heats up water for a heating system in a building or may be used for heating water for washing purposes.

Figure 13:
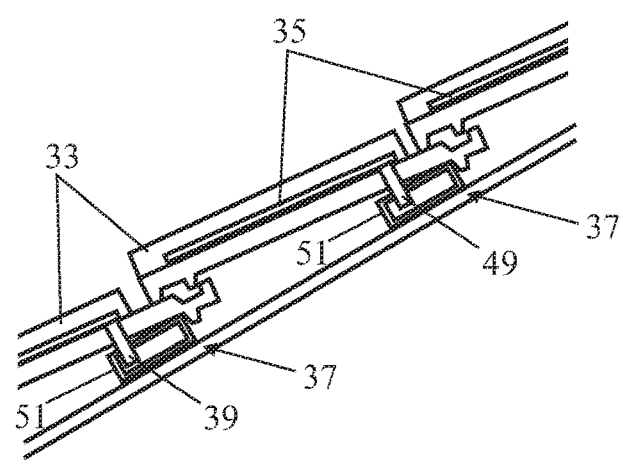
FIG. 13 shows a detail of the hot water system shown in FIG. 12.

For transferring the heat to the cooling medium in a proper manner, pins 49 are fixed to the under side of the metal coatings 35. These pins project through the holes provided in the roof tiles as far as the profiles 51 (see FIG. 13).

FIGS. 14 to 17 show an embodiment of the metal-coating-clad roof tile according to the invention in various views. The roof tile 33 has an upper side 33b on which a panel 55 is installed (see FIG. 11). This panel is formed by a double-walled plate of which the upper wall 57 is transparent and to the inner side of the lower wall 59 of which the metal coating 35 is applied. The space between the walls is shut off from the environment in an airtight manner and has a reduced pressure compared to the environment.

The roof tile 33 has a hole 61 in it through which a pin 63 is projected. This pin is fixed to the under side of the metal coating 35 and forms the conducting system for transferring the heat absorbed by the metal coating to the heat conductor which is formed by the profile 51 of the roof battens.

Albeit in the foregoing disclosure the invention has been explained with reference to the drawing figures, it should be pointed out that the invention is by no means restricted to the embodiments shown in the drawing figures. The invention also pertains to all embodiments deviating from the embodiments shown in the drawing figures within the scope defined by the claims.

The invention claimed is:

1. A method of manufacturing a ceramic roof tile provided with a hole, comprising:
    applying a non-cured composition between two facing mold surfaces of two mold halves;
    pressing the two mold halves together during which operation the composition is pressed into the desired shape in the mold space between the two mold surfaces; and
    subsequently curing the composition pressed into the desired shape, the desired shape having an upper side, characterized in that one of the two mold halves is provided on the mold surface with a bulge that extends toward the other mold surface a distance so that a roof tile having a thinned part in it is manufactured and, after curing of the roof tile, breaking of the thinned part of the roof tile to create said hole, the method further comprising:
    applying a solar panel to the upper side of the roof tile where an electronic unit located on an under side of the solar panel projects through the hole provided in the roof tile.

2. The method of claim 1, further comprising applying a metal coating on at least part of the upper side of the roof tile, which metal coating can be connected to a heat conductor via a conducting element.

3. The method of claim 2, further comprising connecting a conducting element to the metal coating such that heat is conducted to a hot water system.

4. The method as claimed in claim 3, further comprising hooking a plurality of the roof tiles to roof battens which form heat conductors.

5. The method as claimed in claim 3, further comprising connecting a liquid circulation system to the conducting element, the liquid circulation system causing liquid to flow through box profiles.

6. The method as claimed in claim 5, further comprising connecting a pipes coming from and leading to the box profiles to a liquid buffer vessel.

7. The method of claim 1, wherein the composition comprises clay.

8. The method of claim 1, wherein the breaking of the thinned part of the roof tile creates a rectangular hole through the roof tile.

9. A method of manufacturing a ceramic roof tile provided with a hole, comprising:
    applying a non-cured composition between two facing mold surfaces of two mold halves;
    pressing the two mold halves together during which operation the composition is pressed into the desired shape in the mold space between the two mold surfaces; and
    subsequently curing the composition pressed into the desired shape, the desired shape having an upper side, characterized in that one of the two mold halves is provided on the mold surface with a bulge that extends toward the other mold surface a distance so that a roof tile having a thinned part in it is manufactured and, after curing of the roof tile, breaking of the thinned part of the roof tile to create said hole, the method further comprising:
    applying a metal coating on at least part of the upper side of the roof tile, which metal coating can be connected to a heat conductor via a conducting element which comprises a pin; and
    mounting an end of the pin to an under side of the metal coating, such that the pin projects through the hole formed by the breaking act.

10. A method of manufacturing a ceramic roof tile provided with a solar panel, comprising manufacturing a roof tile as claimed in claim 9, applying a solar panel to the upper side of the roof tile where an electronic unit located on an under side of the solar panel projects through the hole provided in the roof tile.

11. A method of manufacturing a ceramic roof tile provided with a hole, comprising:
    applying a non-cured composition between two facing mold surfaces of two mold halves;
    pressing the two mold halves together during which operation the composition is pressed into the desired shape in the mold space between the two mold surfaces; and
    subsequently curing the composition pressed into the desired shape, the desired shape having an upper side, characterized in that one of the two mold halves is provided on the mold surface with a bulge that extends toward the other mold surface a distance so that a roof tile having a thinned part in it is manufactured and, after curing of the roof tile, breaking of the thinned part of the roof tile to create said hole, the method further comprising:
    applying a metal coating on at least part of the upper side of the roof tile, which metal coating can be connected to a heat conductor via a conducting element; and
    mounting a double-walled plate on the upper side of the roof tile, the double-walled plate having an upper wall which is transparent while the metal coating is applied to the inside of the lower wall, including shutting off a space between the walls from the environment in an airtight manner and creating a reduced pressure relative to the environment in this space.

* * * * *